UNITED STATES PATENT OFFICE.

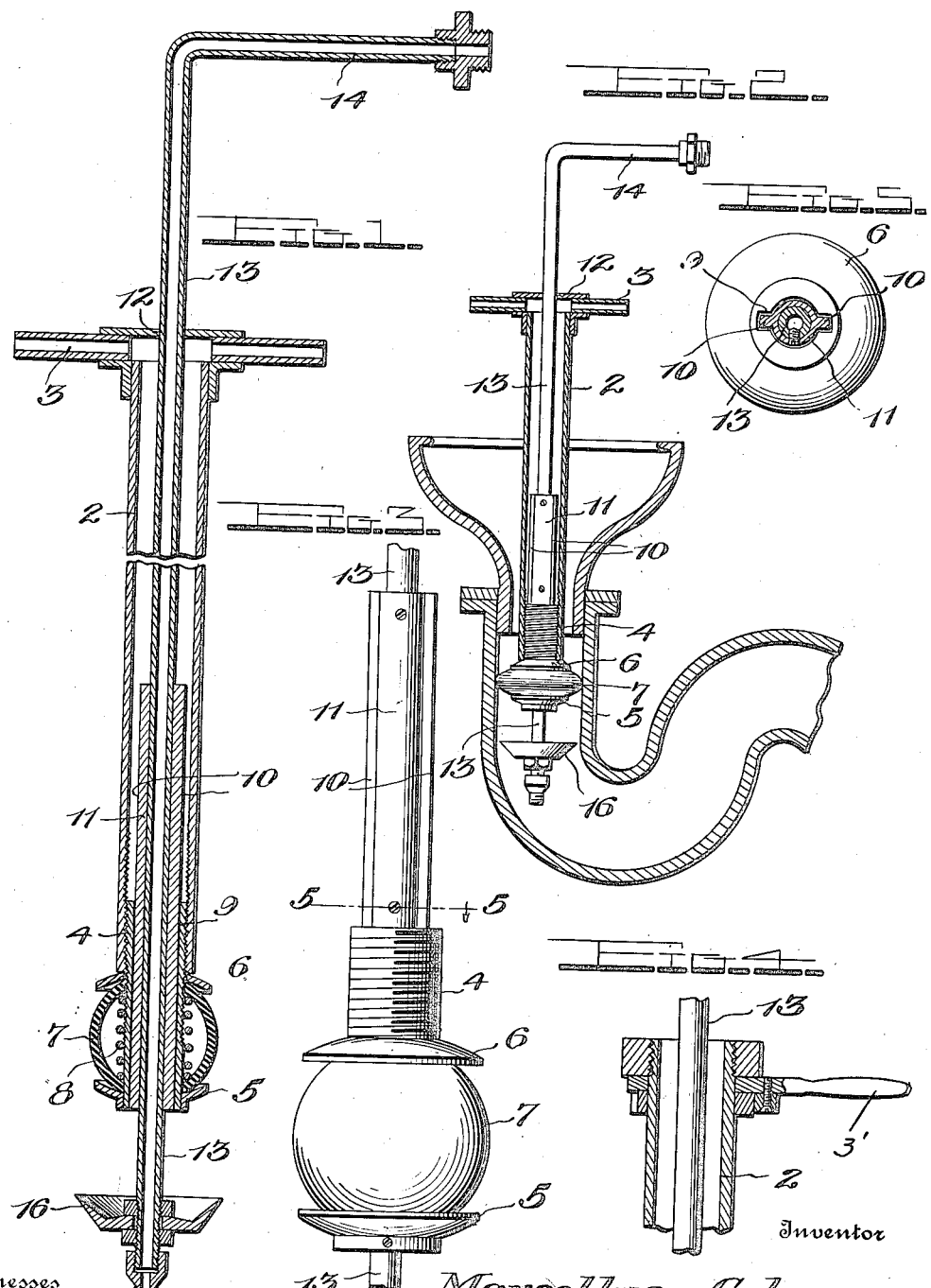

MARCELLUS COLE, OF WASHINGTON, DISTRICT OF COLUMBIA.

DEVICE FOR CLEANING SEWERS AND PIPES.

1,137,580.

Specification of Letters Patent. Patented Apr. 27, 1915.

Application filed September 5, 1914. Serial No. 860,327.

*To all whom it may concern:*

Be it known that I, MARCELLUS COLE, a citizen of the United States, residing at Washington, in the District of Columbia, have invented certain new and useful Improvements in Devices for Cleaning Sewers and Pipes, of which the following is a specification.

The invention relates to devices for removing obstructions in sewer and other pipes; and it consists in providing a plunger with an expansible head, and special means for expanding the head, so as to adapt the plunger to be passed through an opening of small diameter and be caused to operate within a passage of greater diameter than the opening, whereby obstructions in the large passage may be removed.

The invention further consists in providing means for softening hard obstructions, so as to facilitate their ready removal. And the invention still further consists in the novel construction and the peculiar arrangement of the several parts, as will be hereinafter specifically described, and briefly stated in the claims.

The chief object of the invention is to provide a device of the plunger type which will be simple in construction, and most effective in operation.

Other objects of the invention, such as softening the hard obstructions, will become apparent upon a complete disclosure thereof.

In the drawing—Figure 1 is a longitudinal section of my improved device complete; Fig. 2, a sectional view, showing the application of the device to the cleaning of the trap of closet-bowl; Fig. 3, a side elevation of the movable sleeve and guide, detached, and Fig. 4, a modified attachment for rotating the tubular stem.

Referring to the several views, the numeral 2 indicates a tubular stem provided with a suitable handle 3 rigidly secured thereto, as shown in Fig. 1, or it may be a lever 3′ of the double ratchet variety as shown in Fig. 4. The other end of the tubular stem is internally screw-threaded to receive a sleeve 4, one end of which is externally screw-threaded for the purpose. The outer or lower end of the sleeve is provided with a concavo-convex, compression disk 5, and loose upon said end of the sleeve 4 is a similar disk 6, between which is situated a hollow ball 7, preferably rubber, a coil-spring 8 surrounding that portion of the sleeve within the ball, for the purpose of insuring the return of the ball to normal condition after expansion. The inner surface of the sleeve 4 is provided with oppositely-disposed, longitudinal grooves 9, 9 which are adapted to receive tongues 10, 10 of a sleeve 11, and be guided in its vertical movements when the tubular stem is operated.

The head of the operating handle is provided with a central aperture 12 through which passes a tubular rod or pipe 13 having a bent handle 14, the outer end of which is provided with an externally screw-threaded boss 15 to receive a hose. The tubular rod passes through the sleeves 11, to which it is fastened, and through sleeve 2, and has its lower end screw-threaded to receive a flexible spreader 16, adapted to expand to catch and draw up portions of the obstruction. The flexible spreader may be interchangeable with other cleaning implements, such as balls, or devices for cleaning gun-barrels and tubes.

In operating the device, say for example, the cleaning of the trap of a water-closet, as shown in Fig. 2, in which 17 indicates the bowl, and 18 the trap in which the bowl sets, the latter being of a diameter greater than the former, the plunger is passed down through the stem of the bowl and into the trap, and the handle 14 firmly grasped with one hand of the operator, who with his other hand manipulates the handle 3, or the ratchet lever 3′, as the case may be, to rotate the hollow stem 2, which in turn reciprocates the sleeve 4, drawing up said sleeve and its attached compression disk 5 (at the same time compressing the spring) toward the upper disk 6, which is prevented from moving upward by the lower end of the hollow stem 2 against which it is seated, and thereby expanding the ball against the sides of the trap, as shown. Then by pressing down upon the tubular-rod the operator moves the handle of the sleeve 2 up and down, causing the sleeve 4 and its attached and expanded ball to operate as a piston in the trap, loosing up and forcing out the matter which has obstructed it. If the obstruction is so hard as to be difficult to remove by such force-pump like operation, a hose is attached to the screw-threaded boss 15 and a stream of water forced down through the tubular-rod to loosen up the obstruction, when it will readily yield to force-pump like action of the sleeve 2 and its attached ball, the tongue sleeve serving as a guide for the reciprocatory sleeve 4.

It will be noted that the tubular rod or pipe forms an important feature of my invention, as water is forced therethrough to loosen solid obstructions, and thereby facilitate the removal of such obstructions by the piston-like movements of the tubular-stem. The operation of cleaning gun-barrels or tubes is the same, except that emery disks or wipers may be substituted for the spreader.

Having thus fully described my invention, what I claim, is—

1. A device for cleaning sewer-pipes or traps, having in combination a tubular stem provided with an operating handle; a sleeve adapted to be reciprocated within said stem; compression-disks carried by said sleeve; a hollow ball between the compression-disks; a longitudinally-movable sleeve arranged to guide the reciprocatory sleeve, and a pipe secured to the longitudinally-movable sleeve, so as to permit the introduction of water to soften obstructions.

2. A device for cleaning sewer-pipes or traps, having in combination a tubular stem provided with an operating handle; a sleeve adapted to be reciprocated within said stem; compression-disks carried by said sleeve; a hollow ball between the compression-disks; a longitudinally-movable sleeve adapted to guide the reciprocatory sleeve; a spring arranged within the hollow ball for insuring the return of the ball to normal position after expansion, and a pipe or tubular rod secured to the longitudinally-movable sleeve, whereby water is introduced to soften obstructions and thereby facilitate the removal of the same.

In testimony whereof I affix my signature in presence of two witnesses.

MARCELLUS COLE.

Witnesses:
DOROTHY HARVEY,
J. R. NOTTINGHAM.